May 28, 1946.  R. CUMMINGS  2,400,920
TENSILE TESTING MACHINE
Filed Jan. 11, 1944  3 Sheets-Sheet 1
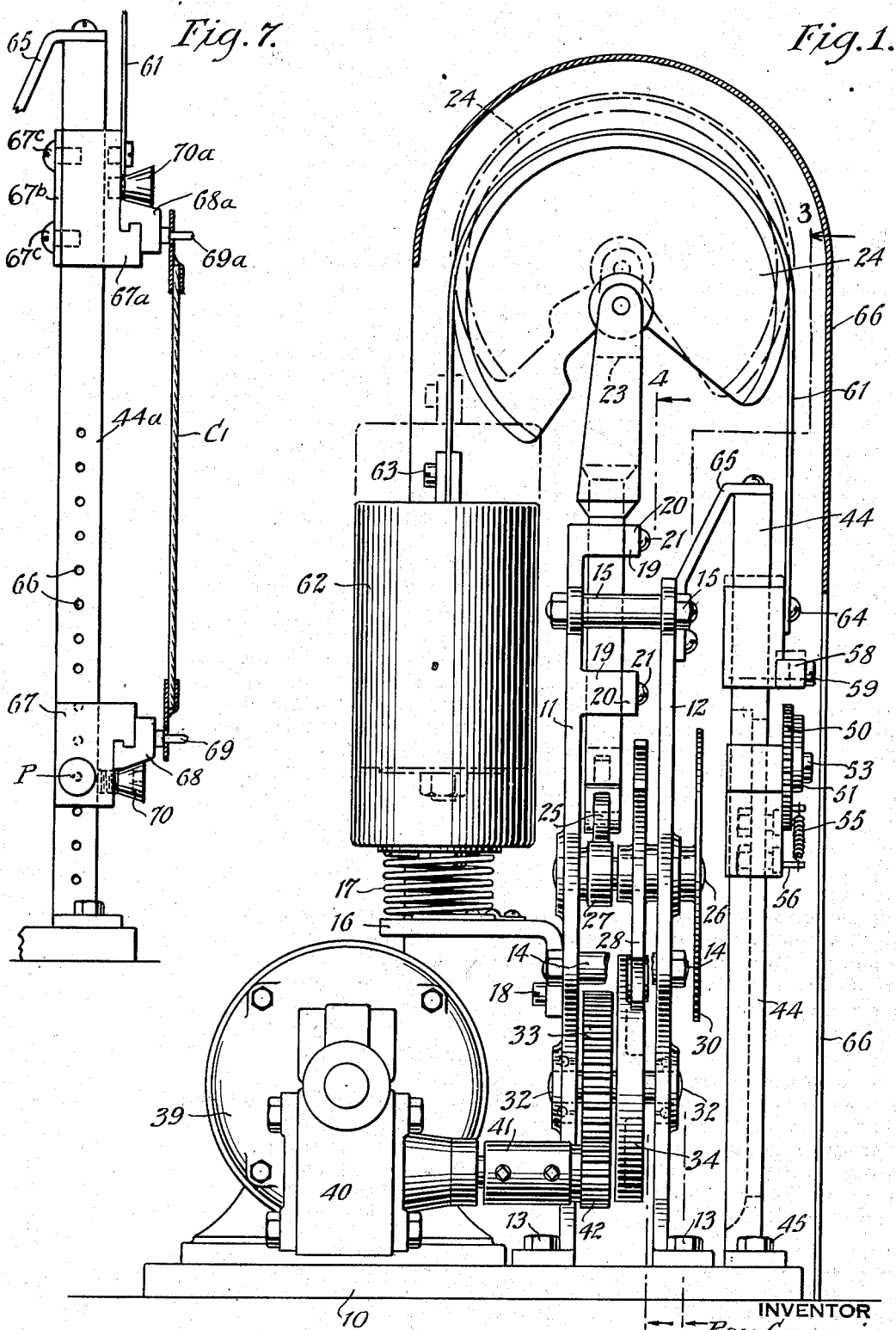
INVENTOR
Roy Cummings
BY
ATTORNEY

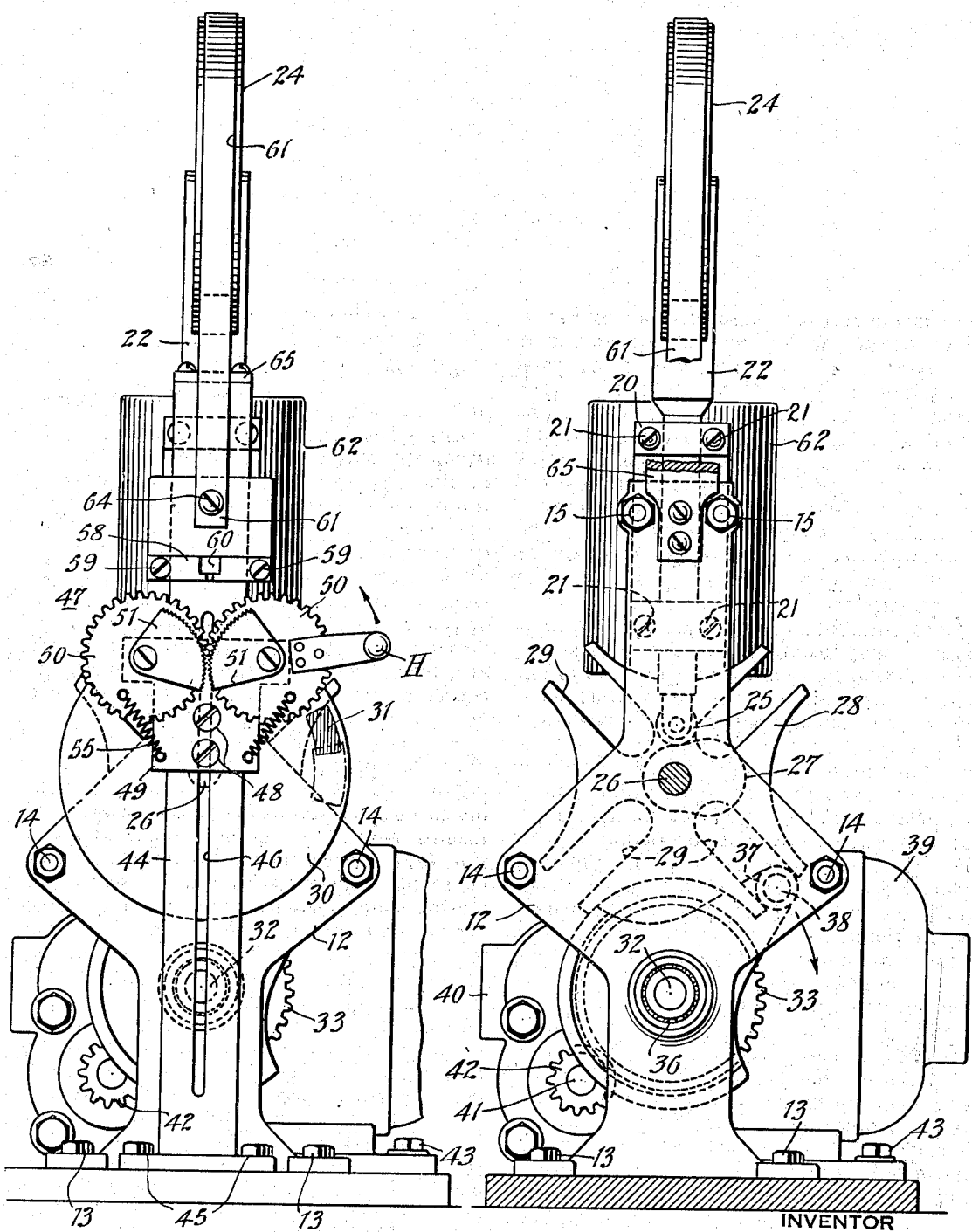

May 28, 1946.                    R. CUMMINGS                    2,400,920
                            TENSILE TESTING MACHINE
                            Filed Jan. 11, 1944                3 Sheets-Sheet 3
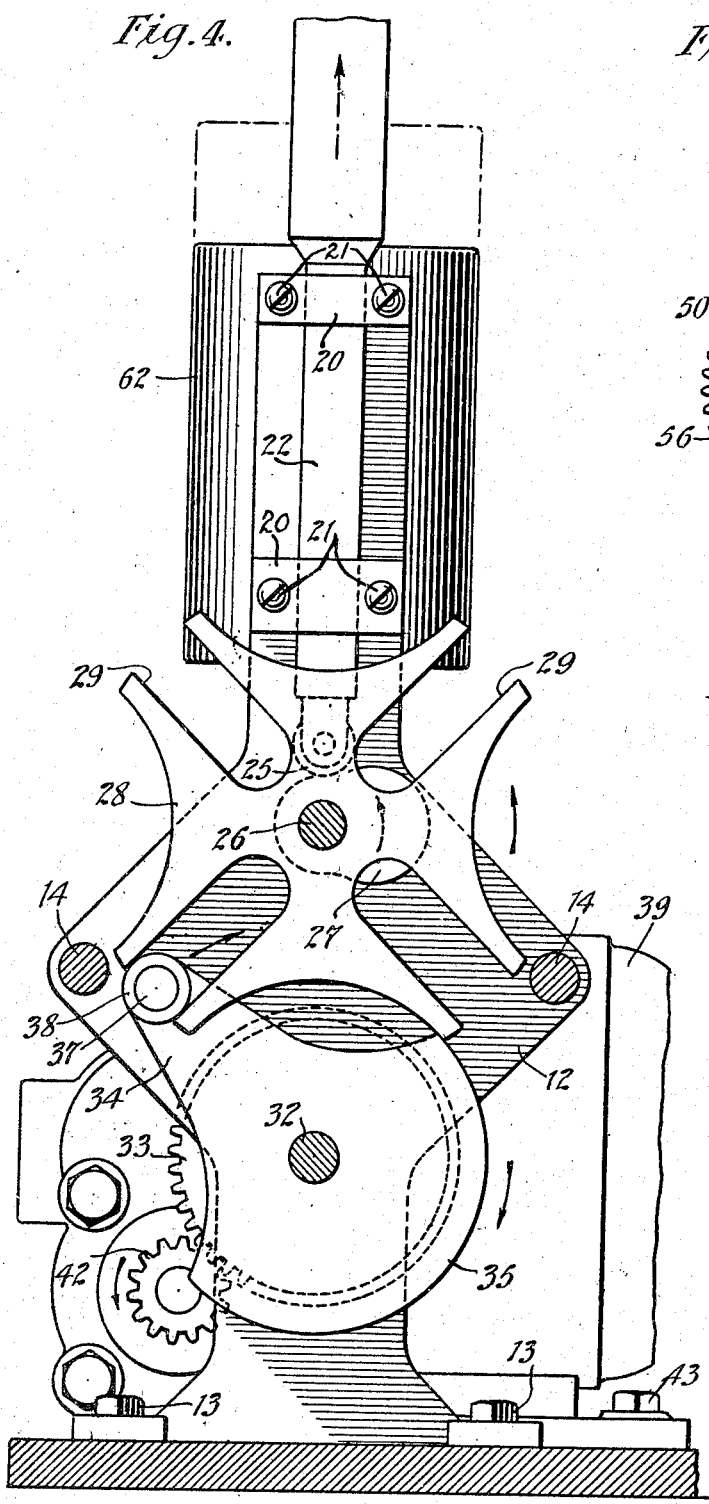
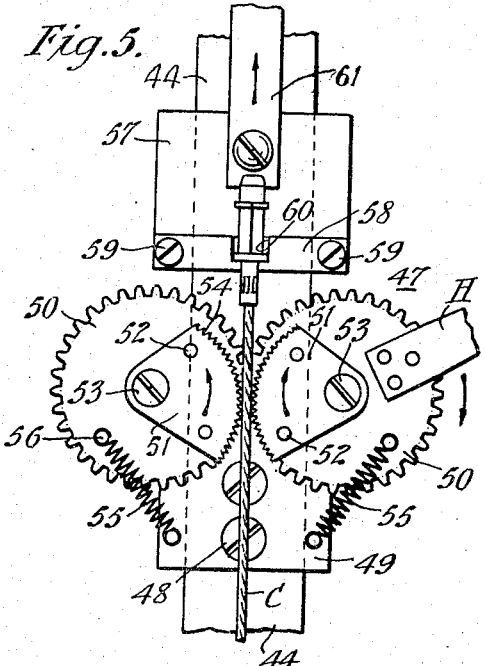
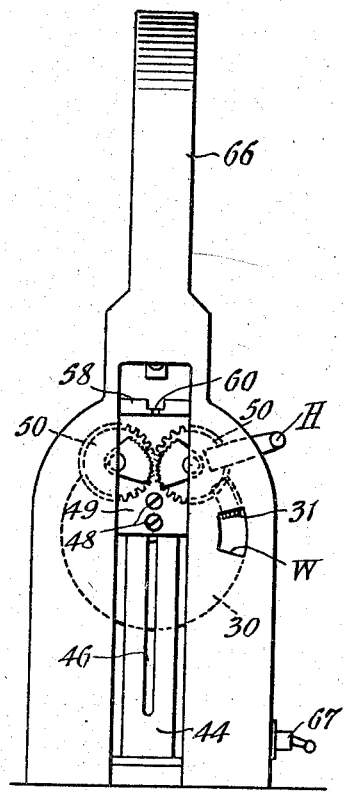
INVENTOR
Roy Cummings
BY
ATTORNEY Patented May 28, 1946

2,400,920

UNITED STATES PATENT OFFICE 2,400,920

TENSILE TESTING MACHINE

Roy Cummings, Bloomfield, N. J., assignor to Curtiss-Wright Corporation, a corporation of Delaware Application January 11, 1944, Serial No. 517,868

4 Claims. (Cl. 73—95)

This invention relates to tensile strength testing devices and more particularly to a testing machine whereby articles comprising a plurality of pieces joined together by means of a soldered joint or a mechanically crimped joint, may be tested for possible weakness in such junctures.

The primary object of the invention is to provide a testing machine as aforesaid whereby uniform tests as to the strength of a soldered or crimped joint may be readily made by an unskilled operator at a constant repetitive rate.

A further object of the invention is to provide a testing machine as specified which is compact, simple in construction and operation, quickly supplied with an article to be tested, automatic in operation and wherein a positively timed intermittent cycle of operation occurs to permit introduction of a specimen without stopping the motor.

Another object of the invention is to provide a testing machine as specified wherein a color indication comes into view periodically to signal the operator of the beginning of a time interval, in the cycle of operation, for placement in the machine of an article to be tested.

A further object of the invention is to provide a testing machine as specified which may be readily adjusted for the reception of articles, for test purposes, which vary in length, diameter or shape, and wherein a dead weight may be increased or decreased in accordance with the test requirements for any particular type of article.

With these and other objects in view, the invention resides in the novel construction, combination and arrangement of parts, the novel features of which are set forth with particularity in the appended claims. The invention itself, however, both as to its organization and its method of operation, together with additional objects and advantages thereof, will best be understood from the following description of a specific embodiment, when taken in connection with the accompanying drawings, in which:

Figure 1 is a side elevational view of a testing machine constructed in accordance with the invention and with an enclosing casing therefor in section;

Fig. 2 is a front elevational view of the same without the enclosure casing;

Fig. 3 is a vertical sectional view taken on the line 3—3 of Fig. 1;

Fig. 4 is a similar vertical sectional view taken on the line 4—4 of Fig. 1;

Fig. 5 is a fragmentary view in elevation of the article clamping and anchoring means per se;

Fig. 6 is a front elevational view of the testing machine substantially enclosed in a casing therefor; and Fig. 7 is a side view in elevation of a modified form of guide bar which is adapted to be substituted for the guide bar shown in Figs. 1 and 2.

Referring to the drawings and particularly to Fig. 1, a testing machine constructed in accordance with the invention, comprises a metallic base plate 10 having a pair of vertically disposed metallic plate members 11 and 12 bolted thereon in transverse spaced relation, by means of the cap screws indicated at 13. The vertically disposed members 11 and 12 are joined in spaced relation at a point substantially intermediate their length and also adjacent the uppermost free ends thereof by means of suitable spacing bolts or studs 14 and 15 whereby to maintain said plate members rigid.

An angle plate 16 having a short coiled spring 17 suitably attached thereto, is secured to the rear face of the vertical plate member 11, substantially intermediate its length, by means of suitable screws 18, the said spring 17 being disposed in an upright position whereby it is adapted to serve as a yieldable buffer or support for an element hereinafter described.

The upper end portion of the vertically disposed plate member 11 is further provided with two pairs of vertically and horizontally spaced rectangular projections 19, each pair being connected with a cross-link 20 secured thereto by suitable screws 21. Thus, the projection 19 and the cross links 20 are adapted to provide a rectangular guide passage for a slide bar 22, as clearly shown in Fig. 4. The upper end portion of the slide bar 22 is bifurcated, as at 23, for the pivotal reception of a segmental pulley or wheel 24. Moreover, the lower end portion of the slide bar 22 is also bifurcated for the pivotal reception of a roller 25, as clearly shown in Figs. 1, 3 and 4 and for a purpose hereinafter described.

A stub shaft 26, carrying a cam 27, and a Geneva stop motion wheel 28, having a plurality of equally spaced radial slots 29 formed therein, is journalled in and between the aforesaid plate members 11 and 12, with the cam 27 in vertical alignment with the aforesaid roller 25 and in cooperative engagement therewith. As viewed in Fig. 1, the right hand end of the stub shaft 26 projects beyond the aforesaid plate member 12 for the fixed reception thereon of a disc 30 having a color segment 31, red for example, painted on a white background or otherwise attached to the front face thereof and adjacent its periphery for a purpose also hereinafter described.

Another stub shaft 32 having a spur gear 33 and a crank arm 34 including a segmental disc 35, fixed thereon, is journalled in and between the aforesaid plate members 11 and 12 adjacent the lowermost ends thereof preferably by means of a pair of anti-friction bearing members indicated at 36. The crank arm 34 is provided with a crank pin 37 having a roller sleeve 38 journalled thereon, and disposed in alignment with the aforesaid stop motion wheel 28 whereby when the said crank arm 34 is rotated, the roller sleeve 38 will move into one of the aforesaid radial slots 29 formed in the stop motion wheel 28 and rotate the same a quarter of one revolution as will be understood.

A suitable electric motor 39 having a speed reduction gear box 40 associated therewith including a drive shaft 41 provided with a pinion gear 42, is secured to the aforesaid base plate 10, by means of suitable cap screws 43, with the said pinion gear 42 disposed in meshed relation with the aforesaid spur gear 33, as clearly shown in Fig. 1.

A vertically disposed metallic guide bar 44 is also secured to the aforesaid base plate 10, by means of cap screws 45, in spaced, forward relation to the aforesaid plate member 12. The guide bar 44 is provided with a central elongated slot 46 and adapted to receive in slidable engagement therewith an article gripping means, generally indicated at 47, which is adapted to be adjustably positioned on said bar 44 and locked in place by means of suitable bolts 48 in a well known manner. The aforesaid gripping means 47 consists of a metallic block 49 of T configuration having a channel formed in one face thereof adapted to slidably receive the guide bar 44.

A pair of gear wheels 50, each having a metallic segment 51 riveted or otherwise secured thereto, as indicated at 52, are pivotally mounted on the front face of the aforesaid block 49, in diametrically opposite, meshed relation by means of the screw studs 53 as clearly shown in Figs. 2 and 5. Each of the segments 51 is provided with a serrated arcuate edge 54, said edges being formed on a center which is offset with respect to the axial center of the gear wheels 50 whereby the said arcuate edges 54 are eccentrically positioned relative to the periphery of the gear wheels 50, to develop points of maximum and minimum separation therebetween in accordance with the direction in which said gear wheels are partially rotated as will be understood.

A finger piece or handle H is riveted to one of the gear wheels 50 whereby the said gear wheels may be partially rotated to move the segments 51 to a point of maximum separation between the serrated arcuate edges 54 and against the action of a pair of retractile springs 55 each having one end thereof attached to one of the said gear wheels 50, and the other end of each spring 55 anchored to the aforesaid block 49 by means of suitable pins 56 as clearly shown in Fig. 5.

A yoke block 57 having a rectangular opening therethrough and a work anchoring bar 58 associated therewith, is also positioned on the aforesaid guide bar 44 for reciprocable movement on and along that portion of the said guide bar 44 directly above the aforesaid T block 49, as clearly shown in Fig. 1. The work anchoring bar 58 is arranged transversely of the yoke block 57 along its lower edge and thus secured thereto by means of suitable screws 59. In order that work to be tested may be attached or otherwise anchored to the work bar 58, a shouldered recess or slot 60 is provided in the bar 58, intermediate its ends, for the reception of a terminal clip, tip, plug, or similar terminal member usually soldered or crimped to one or both ends of an insulated conductor or wire C, as will be understood.

It is to be observed, however, that the aforesaid work anchoring bar 58 is attached to the aforesaid yoke block 57 by the screws 59 in order that the said bar may be readily detached and a similar bar or the like having a different form of recess therein, be substituted therefor whereby articles having a differently shaped terminal member secured thereto, may be readily tested in a manner as hereinafter described.

When the article to be tested comprises a conductor or cable C having a terminal member, as shown in Fig. 5 for example, on each end thereof, both terminal members may be tested simultaneously by substituting a work anchoring bar similar to the one shown at 58 in Fig. 5, for the gripping mechanism generally indicated at 47 as will be understood.

A metallic band, strap, or belt 61 having a suitable weight 62 attached to one end thereof by means of a suitable screw 63, passes over the aforesaid segmental pulley 24 and then downwardly where its remaining free end is secured to the aforesaid yoke block 57 by means of a screw 64 as clearly shown in Fig. 5.

Finally, an angle bracket 65, having one end thereof secured to the uppermost end of the aforesaid guide bar 44 and its opposite end to the upper end portion of the aforesaid plate member 12, serves as a brace to maintain the said guide bar 44 rigid.

As shown in Figs. 1 and 6, a suitable housing 66, having a slot therein for clearing the aforesaid handle H is positioned over the machine to serve as a guard whereby to prevent possible injury to the fingers of the operator and to the mechanism as will be understood. A suitable toggle switch 67 adapted to control the aforesaid electric motor 39 is suitably attached to the side of the housing 66 and interconnected with said motor to a power line not shown. The front face of the aforesaid housing 66 is provided with a clearance opening of suitable size to permit placement of an article to be tested, and also with a sight aperture or window W through which the color designation 31 on the disc 30 may be seen by the operator.

In Fig. 7, there is illustrated a modified form of guide bar which may be substituted for the guide bar 44 shown in Figs. 1 and 2, when a conductor C' having a terminal eye secured to each end thereof, for example, is to be tested. In such cases, the guide bar 44 is removed and the modified guide bar, indicated at 44a, substituted therefor as will be understood.

The guide bar 44a is provided with a plurality of spaced, transverse apertures 66, whereby a work anchoring block 67, having a transverse aperture therein, may be detachably secured to the said guide bar 44a in a predetermined position by means of a suitable pin P, which is adapted to be passed through the respective apertures as will be understood. The aforesaid block 67 is also provided with a detachable jaw 68 having a work attaching pin 69 associated therewith as shown. The jaw 68 is adapted to be clamped to the block 67 by means of a screw 70 having a tapered head which cooperates with the angular bottom face of the jaw 68 as will be understood.

A yoke block 67a adapted to slide on and along the upper end portion of the guide bar 44a is slotted longitudinally for the slidable reception of said guide bar 44a, and retained thereon by means of a gib-plate 67b suitably secured to the rear face of the block 67a by means of the screws 67c. The yoke block 67a is also provided with a detachable jaw 68a having a work attaching pin 69a associated therewith and adapted to be clamped to the block 67a by a screw 70a in a manner identical with that described in connection with the aforesaid jaw 68. As shown in Fig. 7, one end of the aforesaid belt 61 is attached to the yoke block 67a, whereby a pull is exerted on said yoke block as hereinbefore described in connection with Fig. 1.

In accordance with the invention, one complete cycle in the operation of the improved testing machine will now be described.

Initially, the switch 67 is moved to "on" position to energize the motor 39. Assuming that the motor is running and that the red color designation 31, carried by the disc 30, appears in the sight aperture or window W, as shown in Figs. 2 and 6, the operator is thereby informed that the machine is about to "pull" and not to insert an article between the gripping means 47 and the work anchoring bar 58. Immediately after the color designation 31 has passed the window W, the operator proceeds to insert an article C, as illustrated in Fig. 5, by way of example, by seating the terminal member, attached to the article, in the recess 60 formed in the bar 58. The article is then grasped with the left hand and held taut while the handle H is moved upwardly, from the position shown in Fig. 2, with the right hand and so held while the article (insulated conductor) is positioned between the serrated segments 51. When so positioned, the handle H is released whereupon the gear wheels 50 and the segments 51, carried thereby, are urged toward normal position by the springs 55 and the insulated conductor clamped therebetween. From an inspection of Fig. 5, it will be readily apparent that as soon as the article is placed under tension, it will be more firmly clamped between the serrated edges of the segments 51 as will be understood.

In the test operation above described, should the article be defective, the test pull exerted by the machine, will merely pull the terminal member free from the insulated conductor. Under such circumstances, the machine and/or its cycle of operation is not interrupted or effected.

In the aforesaid cycle of operation, the mechanical movement is as follows:

Assume that the motor 39 is running and that the red color designation 31 appears in the sight aperture W as above described. At this point, the crank arm 34 is in the position shown in Fig. 3 and rotating in the direction of the arrow. After approximately three quarters of one revolution, the crank arm 34 again engages the Geneva wheel 28 to rotate the same counter-clockwise. During this movement of the Geneva wheel 28, the cam 27 raises the slide bar 22 and the segmental pulley 24 associated therewith, whereby the weight 62 is raised and a dead weight pull of twenty-five pounds, for example, exerted on the specimen under test by way of the belt 61. In the following revolution of the crank arm 34, the Geneva wheel 28 is again moved through one quarter of one revolution whereby the cam permits the slide bar 22 to descend by reason of the effect of the weight 62 thereon and said weight thereby returned to a position of rest and the belt 61 relieved of the tension or pull thereon. At this point, the red color designation 31 has passed the sight aperture or window W and the operator may now remove the tested article and insert another one in the same manner.

While the invention has been described with respect to certain particular preferred examples which give satisfactory results, it will be understood by those skilled in the art after understanding the invention, that various changes and modifications may be made without departing from the spirit and scope of the invention, and it is intended therefore in the appended claims to cover all such changes and modifications.

What is claimed as new and desired to be secured by Letters Patent, is:

1. In a device of the character described, an intermittent mechanism including a cam, a motor for driving said mechanism, a vertically reciprocable slide bar including a roller coactable with said cam, a pulley pivotally mounted on said slide bar, a guide bar disposed adjacent said slide bar parallel therewith, a work gripping chuck adjustably fixed on said guide bar, a centrally recessed work anchoring block slidably mounted on said guide bar, a weight, means normally supporting said weight, a flexible band disposed on said pulley with the ends thereof secured to said weight and said anchoring block respectively, said slide bar being adapted to periodically elevate said weight in response to the operation of said cam to tension said band, and means affixed to a rotatable element of said mechanism adapted to give a visual indication when said weight is about to be elevated.

2. In a device of the character described, a cyclic mechanism including a cam, and a motor for driving said mechanism, a vertically reciprocable bar including a roller coactable with said cam, a pulley pivotally mounted on said reciprocable bar, a fixed guide bar vertically disposed adjacent said reciprocable bar, a pair of work attaching blocks positioned on said guide bar in spaced relation, each of said blocks including a detachable jaw provided with means for receiving the terminal element of an electrical conductor therebetween, the lowermost block being adjustably secured to said guide bar and the uppermost block positioned thereon for slidable movement relative to said lowermost block, a weight, means normally supporting said weight, and a flexible band disposed on said pulley and connected to said slidable block and said weight respectively, said reciprocable bar being actuated periodically by said cam in response to said mechanism whereby said pulley is elevated to cause said weight to tension said flexible band.

3. In combination with an intermittent mechanism of the Geneva type including a cam and a motor for driving said mechanism, of a vertically reciprocable member including a roller coactable with said cam, a pulley pivotally mounted on said member, a guide bar vertically disposed adjacent said reciprocable member, a work securing means comprising a supporting block adjustably secured on said guide bar with a pair of gears pivoted thereon in meshing relation and a serrated segment secured to each of said gears in eccentric relation thereto, and a slide block having a slotted anchoring bar attached thereto disposed on said guide bar for movement thereon relative to said supporting block, a weight, means normally supporting said weight, a flexible band disposed on said pulley with its ends secured to said weight and said slide block respectively, said reciprocable member being adapted to periodically tension said band to elevate said weight in response to the operation of said cam, and indicia means carried by a rotatable element of said mechanism adapted to give a visual indication when said weight is about to be elevated.

4. In a tensile testing machine, the combination with an intermittent mechanism of the Geneva motion type including a cam, a motor, and a reduction gear train between said mechanism and motor, of a vertically reciprocable bar including a roller coactable with said cam, a pulley pivotally mounted on said bar, a fixed guide bar vertically disposed adjacent said reciprocable bar, a work anchoring means adjustably fixed to said guide bar, a second work anchoring means slidably attached to said guide bar for movement therealong relative to said fixed anchoring means, a weight, means normally supporting said weight, a flexible member disposed on said pulley with the ends thereof secured to said second named anchoring means and said weight respectively, said reciprocable bar being adapted to periodically elevate said weight in response to the rotation of said cam by tensioning said flexible member, and indicia means affixed to an element of said gear train adapted to give a visual indication when said weight is about to be elevated.

ROY CUMMINGS.